(12) United States Patent
Nagae et al.

(10) Patent No.: US 6,843,538 B1
(45) Date of Patent: Jan. 18, 2005

(54) DEVICE FOR CONTROLLING OVER-ROLLING OF VEHICLE BODY

(75) Inventors: Akira Nagae, Susono (JP); Noritaka Yamada, Mishima (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/436,219

(22) Filed: Nov. 9, 1999

(30) Foreign Application Priority Data

Dec. 7, 1998 (JP) .......................................... 10-347130

(51) Int. Cl.$^7$ ............................ B60T 8/60; B60G 17/01; G06F 19/00

(52) U.S. Cl. ...................... 303/146; 303/191; 280/5.51; 701/70

(58) Field of Search ................................ 303/191, 146, 303/149; 701/82–84, 89, 70; 280/5.51, 5.502; 340/429, 440; 180/282

(56) References Cited

U.S. PATENT DOCUMENTS

| | | | |
|---|---|---|---|
| 4,625,993 A | 12/1986 | Williams et al. | |
| 4,803,627 A | 2/1989 | Yasuike et al. | |
| 4,807,128 A | 2/1989 | Ikemoto et al. | |
| 4,809,176 A | 2/1989 | Oowa et al. | |
| 5,016,910 A | 5/1991 | Nagai | |
| 5,134,352 A | 7/1992 | Matsumoto et al. | |
| 5,172,961 A | 12/1992 | Inoue et al. | 303/100 |
| 5,229,944 A | 7/1993 | Yasuno | 701/70 |
| 5,335,176 A * | 8/1994 | Nakamura | 701/45 |
| 5,344,224 A | 9/1994 | Yasuno | 303/111 |
| 5,640,324 A | 6/1997 | Inagaki | |
| 5,673,981 A | 10/1997 | Higashimata et al. | 303/155 |
| 5,700,073 A | 12/1997 | Hiwatashi et al. | 303/146 |
| 5,707,119 A | 1/1998 | Monzaki | |
| 5,727,853 A * | 3/1998 | Monzaki | 303/140 |
| 5,732,371 A | 3/1998 | Fujita | |
| 5,738,420 A * | 4/1998 | Kawaguchi et al. | 303/146 |
| 5,772,289 A | 6/1998 | Nakazawa et al. | |
| 5,816,669 A | 10/1998 | Hiwatashi et al. | 303/140 |
| 5,822,709 A | 10/1998 | Fujita | |
| 5,839,800 A | 11/1998 | Koga et al. | 303/152 |
| 5,850,616 A | 12/1998 | Matsuno et al. | 701/82 |
| 5,863,105 A | 1/1999 | Sano | 303/146 |
| 5,869,943 A | 2/1999 | Nakashima et al. | |
| 5,890,084 A * | 3/1999 | Halasz et al. | 180/282 |
| 5,899,952 A | 5/1999 | Fukada | |
| 5,913,578 A | 6/1999 | Tozu et al. | 303/140 |
| 5,915,800 A | 6/1999 | Hiwatashi et al. | 303/146 |
| 5,915,801 A * | 6/1999 | Taga et al. | 303/152 |
| 5,941,334 A | 8/1999 | Inagaki | |
| 5,974,221 A | 10/1999 | Kato et al. | |
| 6,002,974 A | 12/1999 | Schiffmann | |
| 6,002,975 A | 12/1999 | Schiffmann et al. | |
| 6,065,558 A * | 5/2000 | Wielenga | 180/282 |

(List continued on next page.)

FOREIGN PATENT DOCUMENTS

| | | |
|---|---|---|
| DE | 196 32 943 A1 | 2/1998 |
| DE | 19638 280 A1 | 3/1998 |

(List continued on next page.)

*Primary Examiner*—Xuan Lan Nguyen
(74) *Attorney, Agent, or Firm*—Oliff & Berridge, PLC

(57) ABSTRACT

A device for controlling an over-rolling of a vehicle estimates a first parameter indicative of a rolling amount of the vehicle body, and a second parameter indicative of a change rate of the rolling amount the vehicle body. The device controls the brake system such that the brake system is actuated to accomplish a target deceleration of the vehicle when the first parameter quantity exceeds a predetermined threshold value. The target deceleration is increased from a predetermined minimum value to a predetermined maximum value according to an increase of the second parameter quantity.

6 Claims, 7 Drawing Sheets

U.S. PATENT DOCUMENTS

| | | | |
|---|---|---|---|
| 6,074,020 A | 6/2000 | Takahashi et al. | 303/146 |
| 6,081,761 A * | 6/2000 | Harada et al. | 701/72 |
| 6,104,284 A | 8/2000 | Otsuka | |
| 6,139,120 A | 10/2000 | Fukada | |
| 6,154,697 A | 11/2000 | Otsuka | |
| 6,178,368 B1 | 1/2001 | Otake | 701/70 |
| 6,179,394 B1 | 1/2001 | Browalski et al. | 303/146 |
| 6,192,305 B1 * | 2/2001 | Schiffmann | 180/271 |
| 6,208,927 B1 * | 3/2001 | Mine et al. | 701/70 |

FOREIGN PATENT DOCUMENTS

| | | |
|---|---|---|
| DE | 197 46 889 A1 | 5/1998 |
| DE | 197 47 144 A1 | 6/1998 |
| JP | 06-297985 A | 4/1993 |
| JP | 937407 A * | 2/1997 |
| JP | 10-081215 A | 8/1997 |
| JP | 10278762 * | 10/1998 |

* cited by examiner

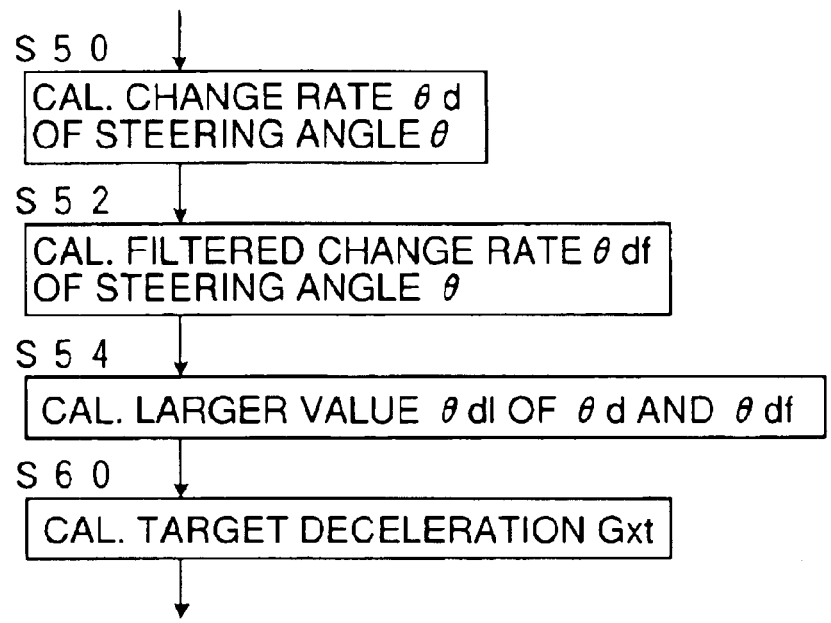
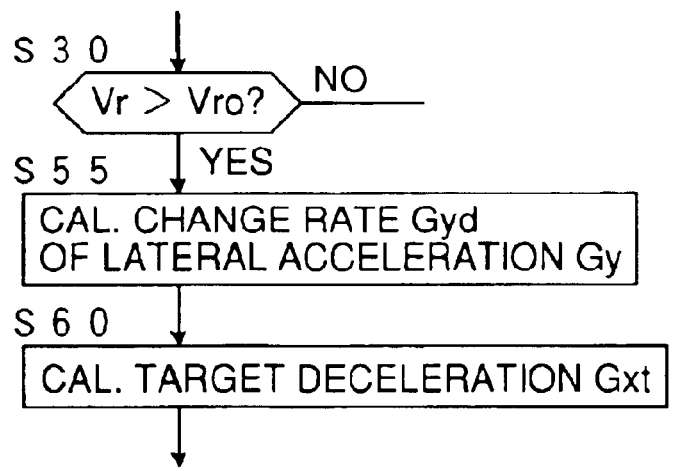

DEVICE FOR CONTROLLING OVER-ROLLING OF VEHICLE BODY

BACKGROUND OF THE INVENTION

1. Field of the Invention

The present invention relates to a device for controlling a turn behavior of a vehicle such as an automobile, and more particularly, to a device for controlling an over-rolling of a vehicle body of a vehicle such as an automobile, so as to prevent the vehicle from rolling over during its turn running.

2. Description of the Prior Art

In Japanese Patent Laid-open Publication 6-297985, there is described a device for preventing a vehicle such as an automobile from rolling over, wherein the heights of a plurality of portions of the vehicle body corresponding to respective wheels are detected by a plurality of height sensors, and the height of the center of gravity of the vehicle body and a roll angle of the vehicle body around the center of gravity are calculated from such a plurality of height data at different portions of the vehicle body, so that, further, by processing those data with a lateral acceleration acting at the vehicle body detected by a lateral acceleration sensor, an index indicative of a liability of the vehicle to a rolling over is obtained for selectively actuating a brake system of the vehicle to decelerate the vehicle before it rolls over.

In the art of the above-mentioned publication, the control of the braking force to be applied to the wheels for preventing the vehicle from rolling over is not particularly described. Indeed, as a matter of concept, the prevention of the vehicle from rolling over during its turn running is generally a matter of emergency, and therefore, the normal approach to this problem will be such that the vehicle should, in any event, be prevented from rolling over at any strength of braking force, provided that the device for preventing a vehicle from rolling over is based upon the actuation of the brake system. Further, since the brake system adaptable to an automatic operation under the operation of a roll over control device principally constructed by a micro-computer operates generally with on-off and/or changeover solenoid valves, it might be ordinary in the art of this field that the actuation of the brake system for preventing the vehicle from rolling over is substantial from the beginning of its actuation, or, in other words, the control of the brake system for this purpose may only be an on-off control.

SUMMARY OF THE INVENTION

However, the present inventors contemplate that the control of the vehicle against a rolling over may also be a part of a normal behavior control not necessarily belonging to an emergency control so that the anti-rolling over control has a damping characteristic which applies a larger anti-rolling over action to the vehicle body as it approaches more to the border of rolling over. By such an arrangement, the vehicle will be more definitely protected against a rolling over, while maintaining a shock-free comfortable running performance.

Therefore, it is a primary object of the present invention to provide a device for preventing a vehicle from rolling over according to the above-mentioned concept of dampening the rolling of the vehicle toward a final limit at which the prior art rolling over prevention device is abruptly actuated.

According to the present invention, the above-mentioned object is accomplished by a device for controlling an over-rolling of a vehicle having a vehicle body, wheels, a steering system and a brake system, the device comprising means for providing a first parameter quantity indicative of a rolling amount of the vehicle body, means for providing a second parameter quantity indicative of a change rate of the rolling amount of the vehicle body, and means for controlling the brake system such that the brake system is actuated to accomplish a target deceleration of the vehicle when the first parameter quantity exceeds a threshold value predetermined therefor, the target deceleration being increased from a predetermined minimum value to a predetermined maximum value according to an increase of the second parameter quantity.

According to the above-mentioned construction, since the brake system is actuated when the first parameter quantity indicative of a rolling amount of the vehicle body exceeds a threshold value predetermined therefor, the selective operation or not of the brake system for the rolling over control of the vehicle is distinctly determined according to the magnitude of the first parameter quantity indicative of a rolling amount of the vehicle body. In this case, as will be appreciated by the incorporation of a control based upon the change rate of the rolling amount of the vehicle body described in detail hereinbelow, since the actuation of the brake system will not necessarily cause a substantial deceleration of the vehicle, the threshold value for the first parameter quantity indicative of a rolling amount of the vehicle body may be set at a value substantially lower than a limit value at which a full actuation of the brake system for the prevention of a rolling over of the vehicle is required according to the prior art device. In any event, the discrimination between the selective operation or not of the brake system for the anti-rolling over control is distinctly available from the relationship of the magnitude of the first parameter quantity and the threshold value predetermined therefor, so that the brake system based upon the on-off and/or changeover valves is explicitly changed over between operation and non operation.

Then, according to the above-mentioned construction, when the brake system was once put into operation for an anti-rolling-over control, the brake system is operated to accomplish a target deceleration of the vehicle that is adjusted between a predetermined minimum value thereof which may allow an early actuation of the brake system relative to the actual rolling state of the vehicle body and a predetermined maximum value thereof, the adjustment being made according to the magnitude of the second parameter quantity indicative of the change rate of the rolling state of the vehicle body. The change rate of the rolling state of the vehicle body predicts an increase or a decrease of a rolling angle of the vehicle body caused by the centrifugal force applied thereto in a turn running of the vehicle.

Therefore when the brake system put into its operation at a relatively early stage of a rolling according to a judgment by the first parameter quantity is controlled to increase its actuation strength from a predetermined minimum value to a predetermined maximum value according to an increase of the second parameter quantity, the vehicle is applied with an anti-rolling over control in a damping manner over a substantial range before the final limit of roll angle at which prior art anti-rolling over control is abruptly actuated.

The first parameter quantity may be estimated to be substantially proportional to the lateral acceleration of the vehicle body, because the rolling of the vehicle body during a turn running herein concerned is substantially proportional to the lateral acceleration acting at the vehicle body due to a centrifugal force. Further, the first parameter quantity may be modified by a rolling rate as a differential component thereof so as to incorporate therein a dynamic characteristic of the rolling movement of the vehicle body, as in the embodiment described hereinbelow.

The second parameter quantity may be estimated to be substantially proportional to the change rate of the steering angle effected by the steering system of the vehicle. By estimating the change rate of the rolling amount of the vehicle body based upon the steering angle, the estimation becomes more predictable, as the change of the steeling angle is advanced to the change of rolling angle.

However, the second parameter quantity may of course be estimated to be substantially proportional to the change rate of the lateral acceleration of the vehicle body in the same manner as the first parameter quantity.

The rolling of the vehicle body is a phenomenon which comes out with a time delay relative to a lateral force applied thereto, because the rolling of the vehicle body is a movement of a mass of the vehicle body resiliently supported by a spring suspension being accelerated by an acceleration applied thereto. In view of this, in order to more effectively actuate the device for controlling an over-rolling of a vehicle according to the present invention, it is contemplated that the device is modified such that the mean for providing the second parameter quantity provide a first phase second parameter quantity at a first time responsiveness and a second phase second parameter quantity at a second time responsiveness slower than the first time responsiveness, and the means for controlling the brake system control the brake system such that the target deceleration is increased from the predetermined minimum value to the predetermined maximum value according to an increase of a larger one of the first and second phase second parameter quantities at each moment. By such an arrangement, the target deceleration is more desirably adapted to incorporate such an inertial delay of the rolling of the vehicle body relative to a lateral force applied thereto.

BRIEF DESCRIPTION OF THE DRAWINGS

In the accompanying drawings,

FIG. 5 is a part of a flowchart which may be substituted for a corresponding part of the flowchart of FIG. 2 as a modification;

FIG. 7 is a part of a flowchart which may be substituted for a corresponding part of the flowchart of FIG. 2 as another modification;

DESCRIPTION OF THE PREFERRED EMBODIMENTS

In the following, the present invention will be described in more detail with respect to some preferred embodiments thereof with reference to the accompanying drawings.

Figure 1:
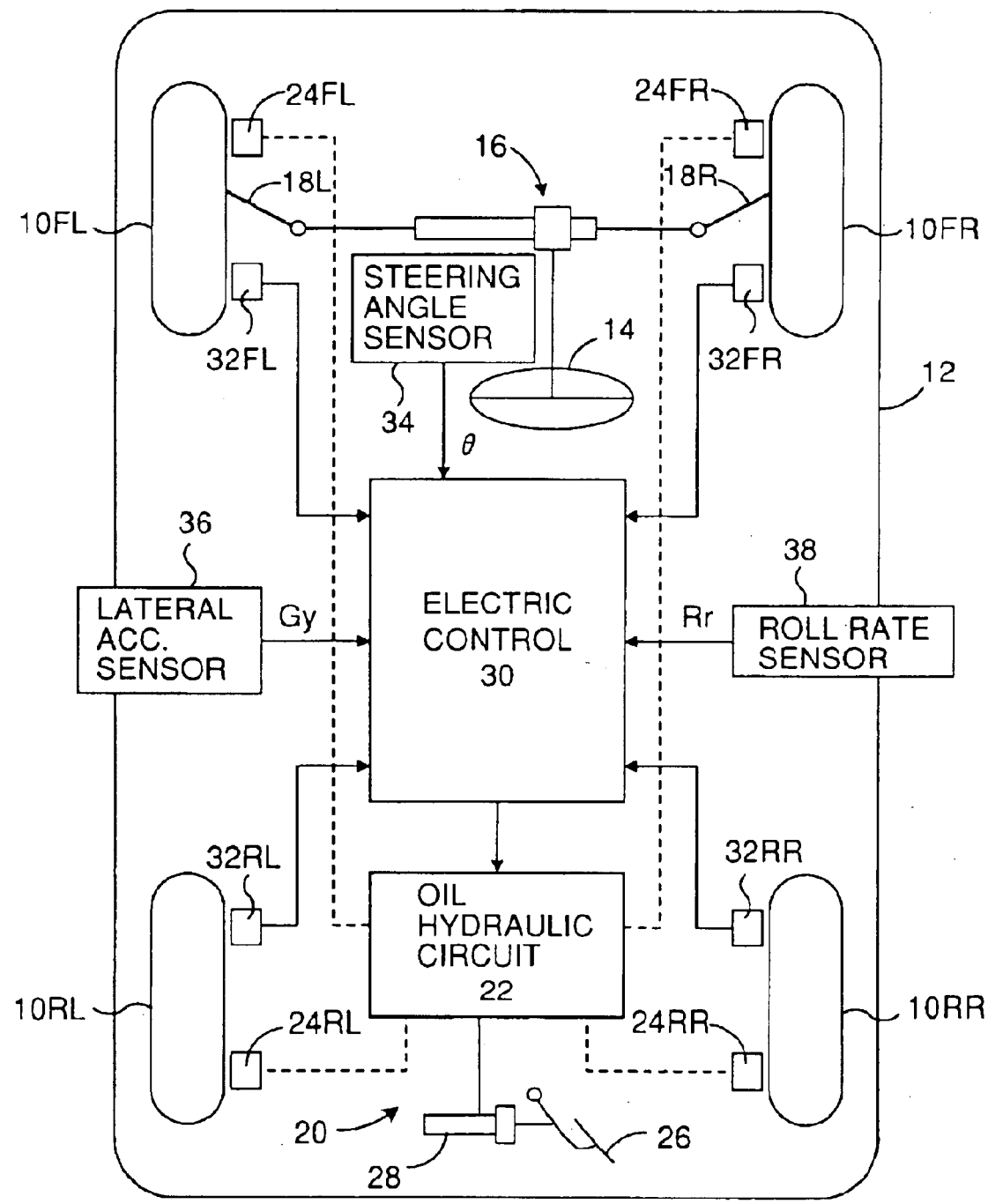
FIG. 1 is a diagrammatical view showing a four-wheeled vehicle in which the device for controlling an over-rolling of a vehicle according to the present invention is incorporated in the form of an embodiment.

In the vehicle diagrammatically shown in FIG. 1, 12 is a vehicle body supported by front left, front right, rear left and rear right wheels denoted as 10FL, 10FR, 10RL and 10RR, respectively, via an ordinary wheel suspension mechanism not shown in the figure. The front left and front right wheels 10FL and 10FR are steered by a steering system including a steeling wheel 14, a rack and pinion type power steering device 16, and tie rods 18L and 18R. The four wheels are adapted to be selectively braked by a brake system generally designated by 20, including an oil hydraulic circuit 22, wheel cylinders 24FL, 24FR, 24RL and 24RR for applying a braking force to the front left, front right, rear left and rear right wheels, respectively, according to an oil pressure supplied thereto from the oil hydraulic circuit 22, a brake pedal 26 adapted to be depressed by a driver, a master cylinder 28 actuated by the brake pedal 26 to generate an oil hydraulic pressure, and electric control means 30 which operate not only as a part of the brake system for automatically actuating the brake system for the device according to the present invention but also as a part of other automatic control systems not shown in the figure incorporated in the shown vehicle. The electric control means 30 are essentially composed of a micro-computer of a common construction including CPU, ROM, RAM, I/O port means and a common bus interconnecting these elements, though not shown in detail in the figure.

Wheel rotation speed sensors 32FL, 32FR, 32RL and 32RR are provided to detect wheel rotation speed of each of the front left, front right, rear left and rear right wheels. A steering angle sensor 34 is provided to detect the steering angle θ effected by a rotation of the steering wheel 14 by a driver. A lateral acceleration sensor 36 is provided to detect lateral acceleration Gy applied to the vehicle body. A roll rate sensor 38 is provided to detect a roll rate Rr of the vehicle body. The output of the wheel speed sensors 32FL–32RR, the steering angle sensor 34, the lateral acceleration sensor 36 and the roll rate sensor 38 are all supplied to the electric control means 30, which conduct control calculations for controlling an over-rolling of the vehicle body as described in detail hereinbelow and dispatch a control signal to the oil hydraulic circuit 22 for automatically controlling the brake system for the over-rolling control according to the present invention.

In the following, an embodiment of the device for controlling an over-rolling of a vehicle according to the present invention will be described in more detail in the form of its operation by referring to FIGS. 2–5, as operable by a construction such as shown in FIG. 1.

Figure 2:
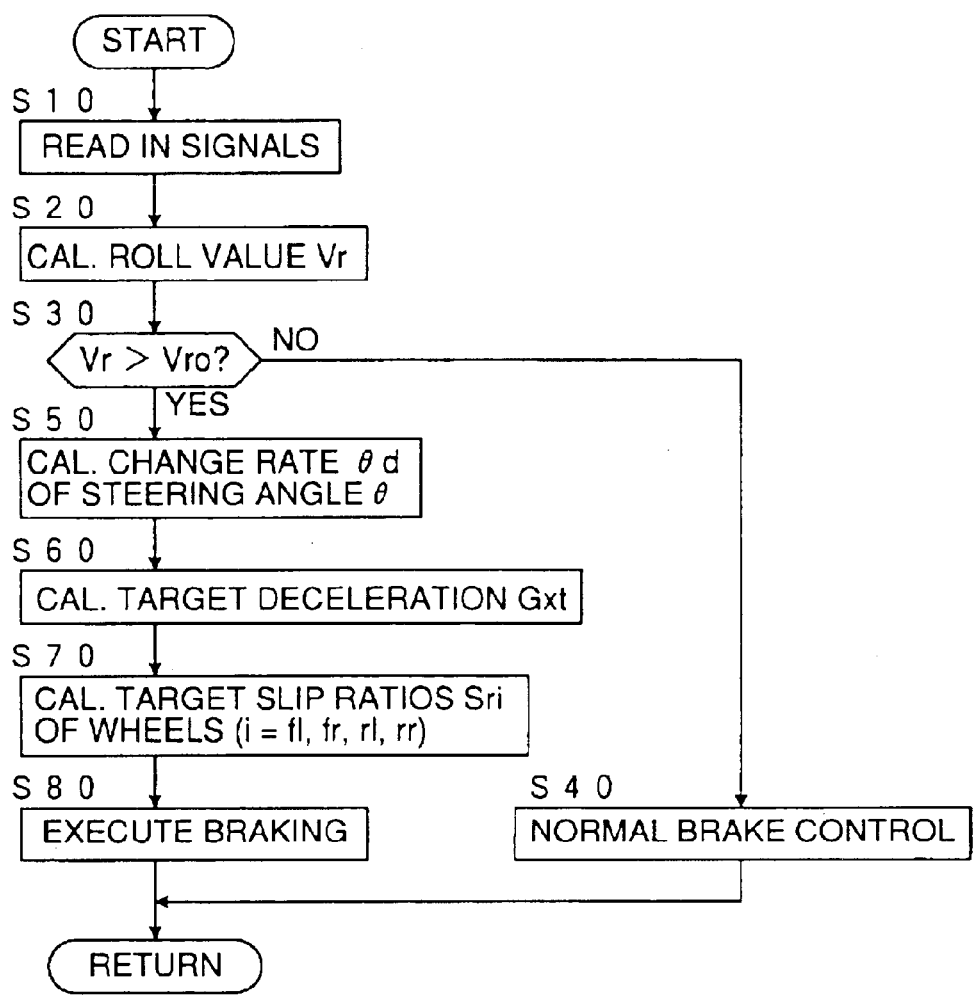
FIG. 2 is a flowchart showing a basic embodiment of the present invention in the form of an operation thereof.

Referring to the flowchart of FIG. 2, in step 10, signals are read in from the wheel speed sensors 32FL–32RR, and others.

In step 20, a first parameter quantity indicative of a rolling amount of the vehicle body, herein called roll value Vr, is calculated based upon the lateral acceleration Gy obtained from the lateral acceleration sensor 3G, with a modification, in this embodiment, by the roll rate Rr obtained from the roll rate sensor 38 according to the below-mentioned formula 1, wherein Ka and Kb are appropriate positive constants:

$$Vr=|Ka \cdot Gy+Kb \cdot Rr|$$

By such an incorporation of the roll rate Rr into the calculation of the roil value Vr, the first parameter quantity is modified to be more than a mere indication of the static rolling amount of the vehicle body.

In step 30, it is judged if the roll value Vr is larger than a threshold value Vro predetermined therefor. When the answer is no, i.e. when the rolling of the vehicle body is still low, requiring no over-rolling control, the control proceeds to step 40, and the brake system is rendered for a normal brake operation depending upon a depression of the brake pedal by a driver and/or other automatic behavior controls executed by the electric control means 30 under separate control programs.

When the answer of step 30 is yes, the control proceeds to step 50, and a change rate $\theta d$ of the steering angle $\theta$ obtained from the steering angle sensor 34 is calculated as the second parameter quantity.

Figure 3:
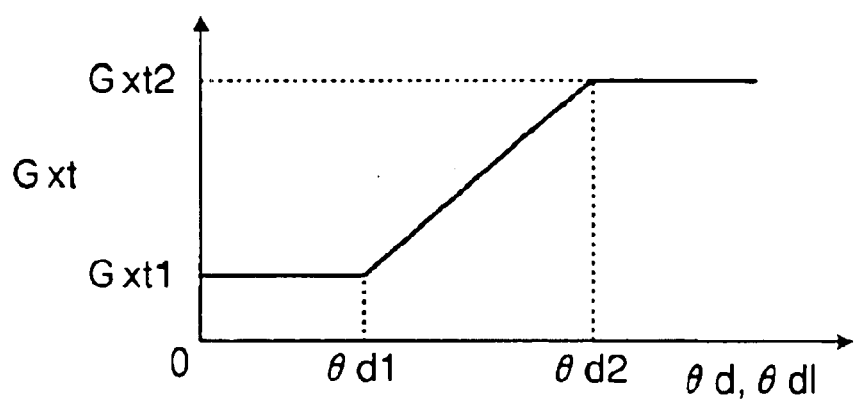
FIG. 3 is a graph showing a map for obtaining a target deceleration based upon the change rate of the steering angle.

In step 60, a target deceleration Gxt for decelerating the vehicle is calculated based upon the steering angle change rate $\theta d$ by referring to a map such as shown in FIG. 3. As will be noted in FIG. 3, the target deceleration Gxt has a minimum value Gxt1, and when the steering angle change rate $\theta d$ increases beyond $\theta d1$, it increases along with increase of the value of $\theta d$ until it saturates to a maximum value Gxt2 when the steering angle change rate $\theta d$ increases beyond $\theta d2$.

In step 70, target slip ratios Sri (i=fl, fr, rl, rr) of the front left, front right, rear left and rear right wheels for accomplishing the target deceleration Gxt of the vehicle are calculated according to the well known principle that the braking force applied to the vehicle through a braked wheel is proportional to the slip ratio of the wheel against the road surface before such a relationship saturates. In this case, the distribution of the slip ratios Sri among the front left, front right, rear left and rear tight wheels may be appropriately determined in order to accomplish an over-steer or an under-steer control at the same time. As well known in the art, a braking of a front wheel serving at the outside of a turn provides an over-steer suppress control, while a braking of the rear wheels, particularly a rear wheel serving at the inside of a turn, provides an under-steer suppress control.

In step 80, based upon the target slip ratios Sri thus obtained, a braking is executed so as to accomplish the target deceleration Gxt of the vehicle.

Therefore, as will be appreciated from the control processes according to the flowchart of FIG. 2, the decision to execute an over-rolling control or not is made based upon a first parameter quantity indicative of the rolling amount of the vehicle body such as the roll value Vr, and therefore indicative substantially of a static rolling state of the vehicle body, so that the over-rolling control is executed when such a first parameter quantity exceeds a threshold value predetermined therefor. In other words, the decision on whether the over-rolling control is executed or not is made substantially according to whether the vehicle body has really rolled so much as to traverse a certain limit or not, although in the shown embodiment, the roll rate Rr also participates in the judgment with an appropriate proportioning factor Kb.

On the other hand, when the over-rolling control has started, the magnitude of the control is varied in such a gradual manner as expressed in the map of FIG. 3 based upon the change rate of the rolling amount of the vehicle body, so as to predict a future change of the rolling amount of the vehicle body.

By such a combination of a kind of digital control for the actuation of the over-rolling suppress control and a kind of analogue control for the strength of the over-rolling control, the over-rolling control for a rolling over suppress control is improved for a higher certainty and a shock-free smoother operation.

Figure 4A:
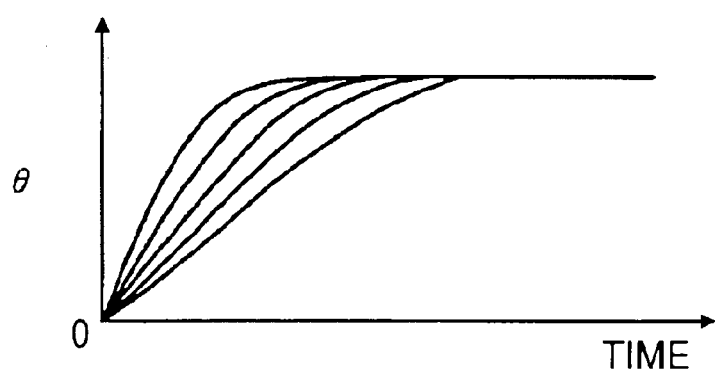
FIG. 4A is a graph showing examples of the change of the steering angle when a vehicle is put into a turn.
Figure 4B:
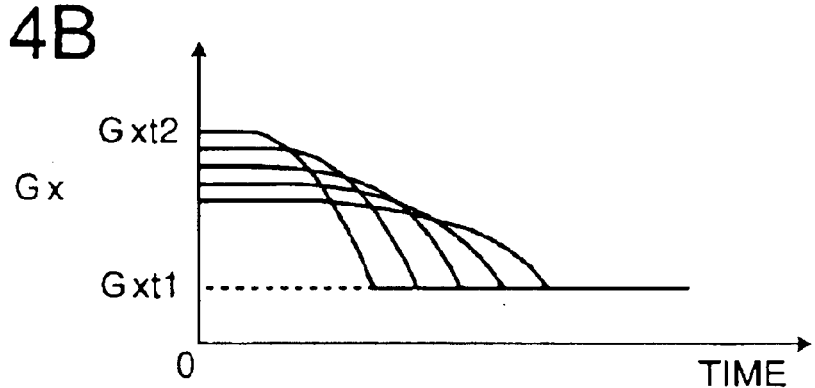
FIG. 4B is a graph showing the target decelerations obtained from the map of FIG. 3 according to such changes of the steering angle as shown in FIG. 4A.

FIGS. 4A and 4B are graphs showing how the target deceleration Gxt changes according to various manner of changes of the steering angle $\theta$ when the target deceleration Gxt is calculated according to the map of FIG. 3.

FIG. 5 shows a part of a flowchart which may be substituted for steps 50 and 60 of FIG. 2. According to this modification, subsequent to step 50, in step 52, a filtered change rate $\theta df$ of the steering angle $\theta$ is calculated such that the filtered change rate $\theta df$ is delayed relative to the change rate $\theta d$ in a manner of representing an inertial delay of the vehicle body in its rolling movement relative to the action of the lateral force applied thereto.

In step 54, a larger one of the change rate $\theta d$ and the filtered change rate $\theta df$ is calculated as a larger value $\theta d1$.

Then, in step 60, the target deceleration Gxt is calculated based upon the larger value $\theta d1$ by looking up the map of FIG. 3.

Figure 6A:
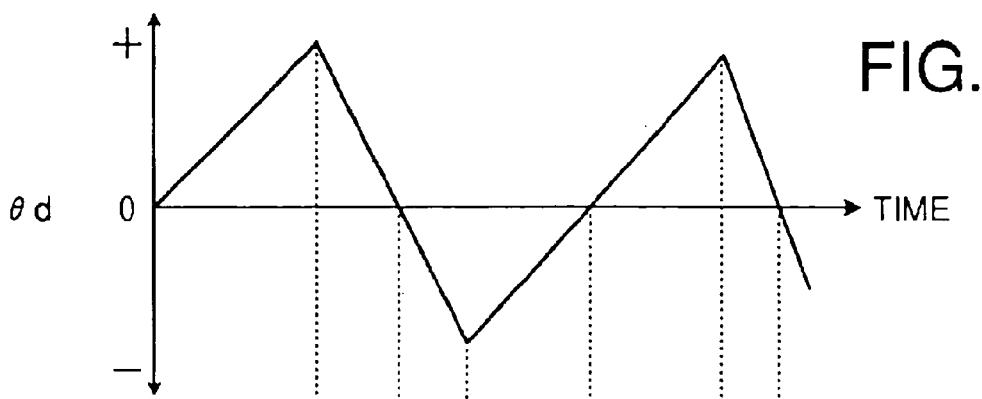
FIGS. 6A–6E are a set of graphs showing an example of changes of the change rate of the steering angle and other values adapted to change according to such a change of the change rate of the steering angle through the operation of the device of the present invention.
Figure 6B:
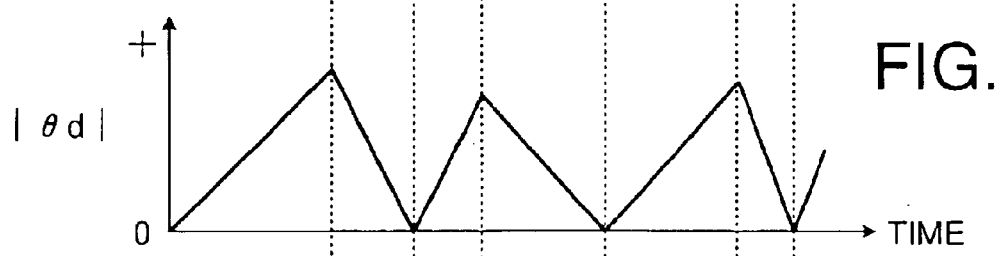

The effect available by the modification of FIG. 5 will be appreciated from FIGS. 6A–6E showing an example of the progress of the over-rolling control according to the present invention. It is assumed that the steering angle change rate $\theta d$ changes as shown in FIG. 6A. For the convenience of simplicity, it is assumed that the braking for the over-rolling control is applied substantially equally to a pair of rear wheels. Then, regardless of the steering direction of the steering system, the braking forces are equally applied to the rear wheels. Therefore, such a change of the steering angle change rate $\theta d$ as shown in FIG. 6A may be processed as shown in FIG. 6B, as if the steering angle change rate $\theta d$ is processed in its absolute value.

Figure 6C:
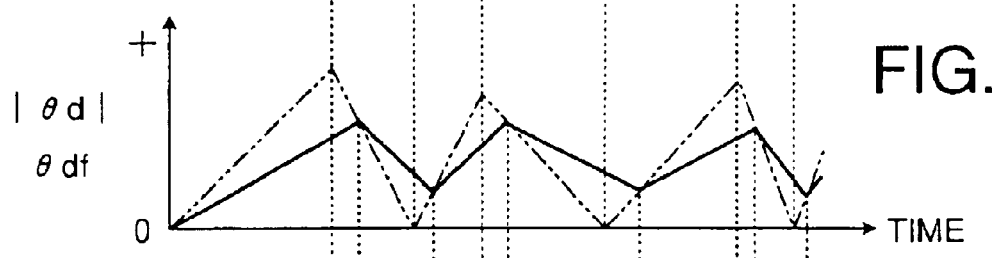
Figure 6D:
Figure 6E:
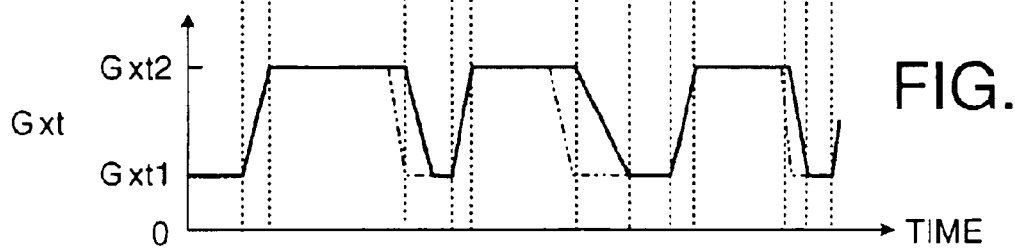

The filtered change rate $\theta df$ calculated in step 52 is generated from the change rate $\theta d$ in a manner such as shown by a solid line in FIG. 6C relative to the change rate $\theta d$ shown by a phantom line. Then, the larger value $\theta d1$ is calculated by step 54 as shown in FIG. 6D. Therefore, when $\theta d1$ and $\theta d2$ bordering the range of gradual increase of the target deceleration Gxt relative to the increase of the steering angle change rate $\theta d$ or $\theta d1$ with its minimum value range and its maximum value range are of the levels shown by two dot lines in FIG. 6D, the target deceleration Gxt will be calculated as shown by solid lines in FIG. 6E, in contrast to the performance partly shown by phantom lines in FIG. 6E to be available when the control is conducted only based upon the steering angle change rate $\theta d$ obtained in step 50. As will be appreciated from FIG. 6E, when the steering angle change rate $\theta d$ is so alternately changed as shown in FIG. 6A, the target deceleration Gxt is calculated to be more desirably adapted to an inertialy oscillatorily rolling movement of the vehicle body by such steps as 52 and 54 being incorporated.

Figure 8:
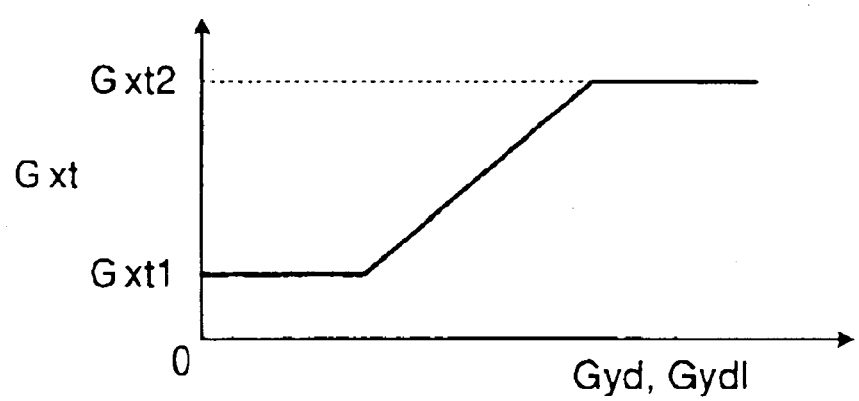
FIG. 8 is a graph showing a map similar to that of FIG. 3 for obtaining a target deceleration based upon the change rate of the lateral acceleration.

FIG. 7 shows a part of a flowchart which may be substituted for steps 30–60 of FIG. 2. In this modification, instead of step 50 of FIG. 2, in step 55 change rate Gyd of the lateral acceleration Gy is calculated as the second parameter quantity indicative of the change rate of the rolling amount of the vehicle body. It will be appreciated that the over-rolling control device according to the present invention can operate substantially in the same manner as the embodiment shown in FIG. 2 by the modification of FIG. 7. In this case, the map for calculating the target deceleration Gxt from the change rate Gyd of the lateral acceleration Gy will be as shown in FIG. 8.

Figure 9:
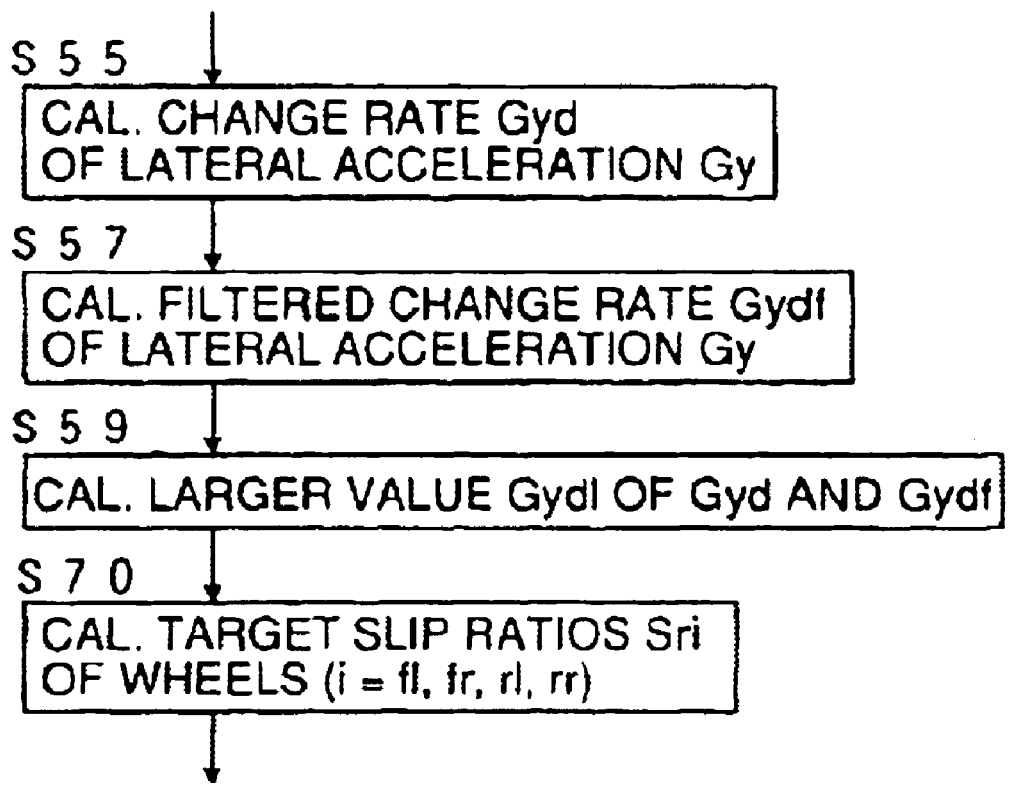
FIG. 9 is a part of a flowchart which may be substituted for a corresponding part of the flowchart of FIG. 7 as still another modification.

FIG. 9 shows a part of a flowchart which may be substituted for steps 55 and 60 of FIG. 7. In this modification, the relationship of steps 57 and 59 relative to steps 55 and 60 of FIG. 7 is the same as that of steps 52 and 54 of FIG. 5 to steps 50 and GO of FIG. 2. Since the principle of the modification of FIG. 9 will be apparent from the descriptions with regard to FIG. 5, further detailed explanation will be omitted to avoid a redundancy of the description.

Although the present invention has been described in detail with respect to a basic embodiment and several modifications thereof, it will be apparent for those skill in the art that other various embodiments and/or modifications are possible without departing from the scope of the present invention.

What is claimed is:

1. A device for controlling an over-rolling of a vehicle having a vehicle body, wheels, a steering system, and a brake system, the device comprising:

means for providing a rolling amount of the vehicle body, means for providing a change rate of the rolling amount of the vehicle body, means for calculating a target deceleration of the vehicle based upon the change rate of the rolling amount so as to increase the target deceleration from a predetermined minimum value to a predetermined maximum value along with an increase of the change rate of the rolling amount, and means for controlling of the brake system such that the brake system is actuated to accomplish the target deceleration of the vehicle when the rolling amount exceeds a threshold value predetermined therefor.

2. A device according to claim 1, wherein the first rolling amount is estimated to be substantially proportional to lateral acceleration of the vehicle body.

3. A device according to claim 1, wherein the rolling amount is estimated to be substantially proportional to a weighted sum of lateral acceleration and roll rate of the vehicle body.

4. A device according to claim 1, wherein the change rate of the rolling amount is estimated to be substantially proportional to a change rate of steering angle effected by the steering system of the vehicle.

5. A device according to claim 1, wherein the change rate of the rolling amount is estimated to be substantially proportional to a change rate of lateral acceleration of the vehicle body.

6. A device according to claim 1, wherein the means for providing the change rate of the rolling amount provides a first phase change rate of the rolling amount at a first time responsiveness and a second phase change rate of the rolling amount at a second time responsiveness slower than the first time responsiveness, and the means for controlling the brake system controls the brake system such that the target deceleration is increased from the predetermined minimum value to the predetermined maximum value according to an increase of a larger one of the first and second phase change rate of the rolling amount at each moment.

* * * * *